June 29, 1971  W. S. MAXEL ET AL  3,589,947

WATER ACTIVABLE STORAGE BATTERY

Filed Feb. 19, 1970

Inventors
W. S. Maxel
G. M. Ginnow
By Glenn A. Buse
Attorney

United States Patent Office 3,589,947
Patented June 29, 1971

3,589,947
WATER ACTIVABLE STORAGE BATTERY
Walter Samuel Maxel, West Allis, and Gary Milborn Ginnow, Milwaukee, Wis., assignors to Globe-Union Inc., Milwaukee, Wis.
Filed Feb. 19, 1970, Ser. No. 12,810
Int. Cl. H01m 21/00
U.S. Cl. 136—114                    17 Claims

ABSTRACT OF THE DISCLOSURE

A water-activable storage battery having a container, storing a measured amount of concentrated electrolyte, positioned above the battery elements and a container-opening assembly, which includes a water-reactive material capable of releasing sufficient heat upon reacting with water added to the battery to melt or burn a discharge opening into the container. The concentrated electrolyte drains from the container via a metering device at a controlled rate and admixes with the water to provide the operating electrolyte. The water-reactive material, preferably potassium, is protected from oxdiation by a protective film of a water-soluble material.

BACKGROUND OF THE INVENTION

Field of the invention

This invention relates to a water-activable storage battery and a method for activating same, more particularly, to a dry charge storage battery having means for retaining a concentrated electrolyte within the battery casing which is subsequently released upon the addition of water to the battery.

Description of the prior art

Dry charge lead-acid batteries adapted to be activated by the addition of sulfuric acid are in wide use. Such batteries require the addition of the sulfuric acid at the point of use. This on-the-site addition of sulfuric acid by the retailer or user requires the separate transportation and storage of the electrolyte, as well as the handling of sulfuric acid by personnel at the time of battery activation. The hazards presented by the required handling of sulfuric acid for the activation of dry charge batteries are obvious. Furthermore, the costs associated with the transportation of sulfuric acid are significant because of the special handling requirements and the added weight of the water which is a substantial proportion of the diluted acid electrolyte. Also, the conventional dry charge batteries do not activate readily at low temperatures. This problem is customarily overcome by heating the battery or by applying a boost charge to the battery after adding electrolyte. The resulting expense and delays are often objectionable.

Many attempts have been made to manufacture dry charge storage batteries which obviate the handling and activation problems outlined above. One general approach has been to provide a reservoir containing a measured amount of concentrated sulfuric acid within each battery cell adapted to be ruptured or disintegrated at the time or after water is added to the cell. For example, U.S. Pat. 2,832,814 discloses a construction wherein a reservoir of acid located above the plates in each cell can be emptied into its associated cell by removing a stem-like closure device which opens a discharge hole in the bottom of the reservoir. This closure device is removed from the battery through the filling port. One disadvantage of this construction is that the stem-like device may be accidentally depressed during handling of the battery; thus inadvertently causing premature emptying of the reservoir and consequential destruction of the battery element by the concentrated sulfuric acid. Also, there is the likelihood of the electrolyte being splashed outside the battery upon removal of the stem by personnel activating the battery.

Similar constructions utilizing mechanical approaches for rupturing a reservoir of concentrated acid, with the same general disadvantages, are disclosed in U.S. Pats. 2,773,927 and 3,455,740.

A different approach utilizing chemical means for rupturing the reservoir of concentrated sulfuric acid is disclosed in U.S. Pat. 3,304,202 wherein concentrated sulfuric acid is stored in a reservoir made from a material which is water insoluble but soluble in an organic solvent. An organic solvent, stored in a capsule made from a water-soluble material, is mounted on top of the reservoir of acid. Upon the addition of water when the battery is activated, the capsule dissolves thereby releasing the organic solvent which in turn dissolves the reservoir to release the concentrated acid.

The primary disadvantage of this system is that the area and rate of dissolution of the acid reservoir by the solvent is highly unpredictable; therefore, the rate of acid release from the reservoir is also highly unpredictable. A controlled and predictable rate of release of the concentrated sulfuric acid is very important. It is well known that a reasonably large quantity of heat is produced when concentrated sulfuric acid is mixed with water. If the acid is added too rapidly, the amount of heat generated can cause damage to the separators and other battery components. Also, the acid reacts with the lead carbonate of the battery plates causing the evoluion of carbon dioxide therefrom. If the acid is added too rapidly, the resultant evolution of carbon dioxide can become so vigorous that the acid boils out through the fill ports with the incumbent hazards associated therewith. Thus, it can be seen that the unpredictability of the rate of acid release associated with this system is highly undesirable.

SUMMARY OF THE INVENTION

An object of this invention is to provide an improved, water-activable dry charge battery and a simplified method of activating same which overcomes the above problems and can be activated by relatively untrained personnel.

Another object of this invention is to provide such a battery wherein the premature release of electrolyte from a self-contained reservoir is minimized and the electrolyte is released in a controlled manner upon activation.

Still further object of this invention is to provide such a battery which can be activated by merely adding water to each battery cell.

According to this invention, each battery cell is provided with a container, which is made from a water-insoluble and electrolyte-resistant material and stores a measured amount of concentrated electrolyte disposed above the battery elements, and a container-opening means which includes a material that releases sufficient heat upon reacting with water added to the battery cell during activation to melt a small discharge opening into the container thereby allowing the acid to flow therefrom and mix with the water. In one particularly effective embodiment of this invention, the container, positioned in the cell above the plates, is in the form of a thin flexible bag of plastic material, e.g., polyethylene, and the container-opening means includes an activator assembly attached to the lower portion of the bag which holds the water-reactive material, e.g., potassium, in juxtaposition to the container. In this embodiment, water-reactive material is at least partially encapsulated with a thin film of a water-soluble material, e.g., polyvinyl alcohol, for protection against oxidation and further protected against moisture by immersion in a water-immiscible material to prevent a premature reaction between the water-reactive material and water. As water is added to a battery cell and reaches the level of the activator assembly, the water-soluble protective film is dissolved, the water-immiscible material is dispersed and the water-reactive material reacts exothermally with the water and melts a small discharge opening in the bag. In another preferred embodiment, the activated assembly includes a metering device which controls the rate at which the concentrated electrolyte drains from the container.

With this invention a person only needs to add water to each of the battery cells for proper activation; no additional steps are necessary. Therefore, relatively untrained personnel can safely and readily activate the battery embodying this invention. As the concentrated electrolyte admixes with the water, sufficient heat is generated to eliminate the necessity of a boost charge normally required for low temperature activation of conventional dry charge batteries.

Electrolyte stored in the container can be sulfuric acid in concentrated liquid form, e.g., sulfuric acid having a specific gravity of 1.835, or a thickened, flowable gel. Moreover, it should be appreciated that the use of the electrolyte container and container-opening means in accordance with this invention is not restricted to lead-acid batteries. Batteries of the alkaline-types, such as nickel-cadmium, nickel-iron, silver-zinc and the like, employing concentrated liquid alkaline electrolytes, such as potassium hydroxide, can also be used.

The material used for making the electrolyte container should be water insoluble and nonreactive with the concentrated electrolyte contained therein. The material should also have a reasonably high resistance to the diffusion of the concentrated electrolyte, both the liquid electrolyte and vapors thereof, in order to minimize adverse corrosion of the internal components of the battery during storage. In addition to the above criteria, the type and thickness of the material used for the electrolyte container should provide sufficient structural integrity so that a filled container can withstand the impact loads imposed on the battery during transportation and/or handling without rupturing and should also have a relatively low melting point. Representative examples of materials suitable for use with concentrated sulfuric acid include polyethylene, polymers of propylene, vinyl resins, polystyrene and the like having a thickness of about 2 mils or more. The preferred materials are those which are flexible and can be fabricated into the container by conventional extrusion and sealing techniques.

The water-reactive material suitable for use in this invention include those which release sufficient heat, upon reacting with water, to soften the container material so that a discharge opening is produced therein. The opening can be produced by the combined effect of a reduction in the structural strength of a localized area of the electrolyte container as it is being heated and the force produced by the weight of the electrolyte, as well as actually melting an opening through a wall of the container. It should be appreciated that the amount of heat, and therefore the type and quantity of the water-reactive material, required to accomplish this function is dependent to a large degree upon the particular type and thickness of material used for the electrolyte container. Also, the reaction products produced by the water-reactive material should not be detrimental to the operation of the battery.

Representative examples of suitable water-reactive materials include the alkaline metals, i.e., potassium, sodium, lithium, cesium and rhobidium, and most of the alkaline earth metals, e.g., calcium, barium, and strontium, as well as many hydrides and carbides thereof, such as calcium hydride, lithium hydride, lithium aluminum hydride, barium hydride, potassium hydride, sodium hydride, calcium carbide and barium carbide. Also, the more reactive amides, antimonides and nitrides of these alkali metals and alkaline earth metals can be used. The alkali metals are preferred because, generally, they release heat at a higher rate thereby effecting a more rapid melting of the electrolyte container, therefore, requiring smaller quantities thereof. Potassium is the most preferred water-reactive material.

The quantity of water-reactive material used is determined by correlating the amount and rate of heat released by the particular material upon reacting with water and the amount of heat required to adequately soften the particular electrolyte container material being used to produce a discharge opening. Since most water-reactive materials suitable for use in this invention react quite vigorously with water, amounts wihch will produce excessive heating and/or violent gas evolution, with consequent "boiling over" of the electrolyte out through the battery filling ports, should be avoided. For most applications, the amount of water-reactive material required for each cell will be a small fraction of a gram. As will be appreciated by those skilled in the art, the optimum quantity of any particular water-reactive material can be determined with a minimum of testing. As a guide, it has been found that a 0.1 gram pellet of metallic potassium is sufficient to provide a discharge opening in an electrolyte container made from a polyethylene film 2 mils thick.

The primary purpose of the water-soluble material is to protect the water-reactive material against oxidation, thereby reducing its reactivity with water, during storage. Therefore, the material should have a high resistance to oxygen diffusion. Representative examples of protective water-soluble materials include polyvinyl alcohol, polymers of methylcellulose, polyethylene oxide and other film-forming, water-soluble resins.

In addition to the water-soluble film for protection of the water-reactive material against oxidation, the water-reactive material is further protected against moisture, preferably by immersing it in a material immiscible with water, such as a mixture of mineral spirits and mineral oil or similar material. The specific gravity of the water-immiscible material should be less that of the water-reactive material to prevent the latter from floating. The water-reactive material can also be protected against moisture by saturating the water-soluble material with a water-immiscible material or by providing the water-soluble material with an outer film of a water-immiscible material.

The advantages of the present invention will become more apparent from the following detailed description of a preferred embodiment, the accompanying drawing and the appended claims.

DESCRIPTION OF THE PREFERRED EMBODIMENTS

Figure 1:
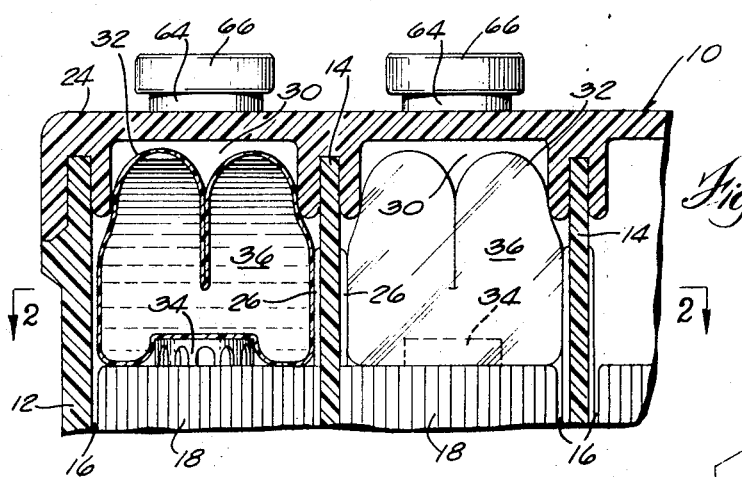
FIG. 1 is a side elevation view of a portion of a storage battery with part of the container broken away to show the arrangement of the electrolyte container and activator assembly within the cell of a battery.

In FIG. 1 reference 10 generally designates a battery comprising a casing 12 having a plurality of cell partition walls 14 molded integrally with the container to form cell compartments 16. A conventional dry charge battery element 18 is mounted in each chamber 16.

Elements 18 are a conventional design and include positive and negative plates alternately arranged and with suitable straps 20 of opposite polarity cast to the respective positive and negative plates of each element. The elements in the end chambers are provided with terminal post 22 (one shown) which are connected to one of the straps 20 and extend upwardly through the battery cover 24 for external electrical connection in the circuit in which the battery is to be used. Straps 20 (other than those having a terminal post 22 thereon) are provided with upstanding connector lugs 26 which are connected together through aperture 28 in partition walls 14 by any suitable method, such as that described in U.S. Pat. 3,313,658. The connections are made so that the negative plates of one element are connected to the positive plates of the adjacent element.

A space 30 is provided in each cell compartment between the cover 24, the top of the elements 18 and the walls 14. Located within space 30 in each cell compartment 16 is a sealed thin wall electrolyte container 32 storing a charge of concentrated sulfuric acid 36 and an activator assembly 34 attached thereto. Container 32 can be in the form of a flexible bag as shown, rectangular or any other form or shape adaptable to space 30. The containers in the two end cell compartments of the battery are bifurcated at one end to accommodate terminal post 22 as shown in FIG. 2.

Figure 4:
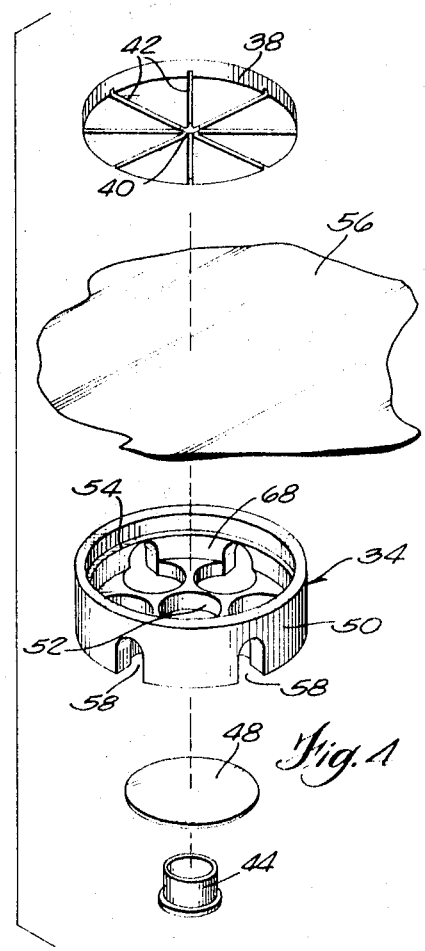
FIG. 4 is an exploded, perspective view of an activator assembly.
Figure 3:
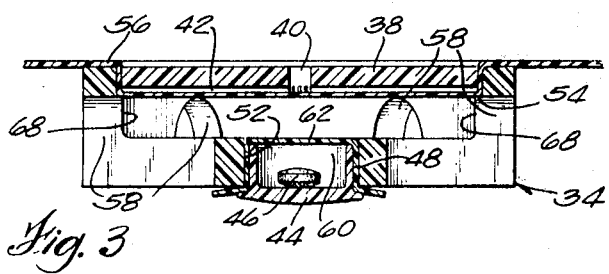
FIG. 3 is a side elevation view, in cross section, of an activator assembly shown attached to the electrolyte container.

As shown in FIGS. 3 and 4, activator assembly 34 includes a metering device 38 having an aperture 40 and a plurality of grooves 42 emanating radially therefrom, a cup-shaped, receptacle 44 holding a small, water-reactive pellet 46 of metallic potassium, a water-soluble film 48 formed from polyvinyl alcohol and a holding fixture 50 having an aperture 52 into which receptacle 44 with film 48 fitted tightly thereover is press fitted. Metering device 38 is positioned inside container 32 and press fitted onto rim 54 of fixture 50 with a small section 56 of the bottom of container 32 deformed therebetween. Holding fixture 50 is provided with a plurality of openings 58 for the passage of water and evolved gases as described hereinafter. Metering device 38, holding fixture 50 and receptacle 44 are constructed from acid-resistant materials such as polyethylene, polymers of propylene, vinyl resins, ceramics and the like.

Receptacle 44 is filled completely with a water-immiscible material 60, such as a mixture of mineral spirits and mineral oil to protect pellet 46 against any moisture which might diffuse through film 48. The mineral spirits is admixed with mineral oil to reduce the specific gravity thereof to a point below that of pellet 46 so that the pellet will not float. Film 48 is fitted over receptacle 44 so that no air, which can cause oxidation of pellet 46 and reduce its reactivity with water, is entrapped in the receptacle. Other means for excluding moisture from the water-reactive pellet can be used, such as providing a film of mineral oil or similar material on the top surface 62 of film 48.

Figure 2:
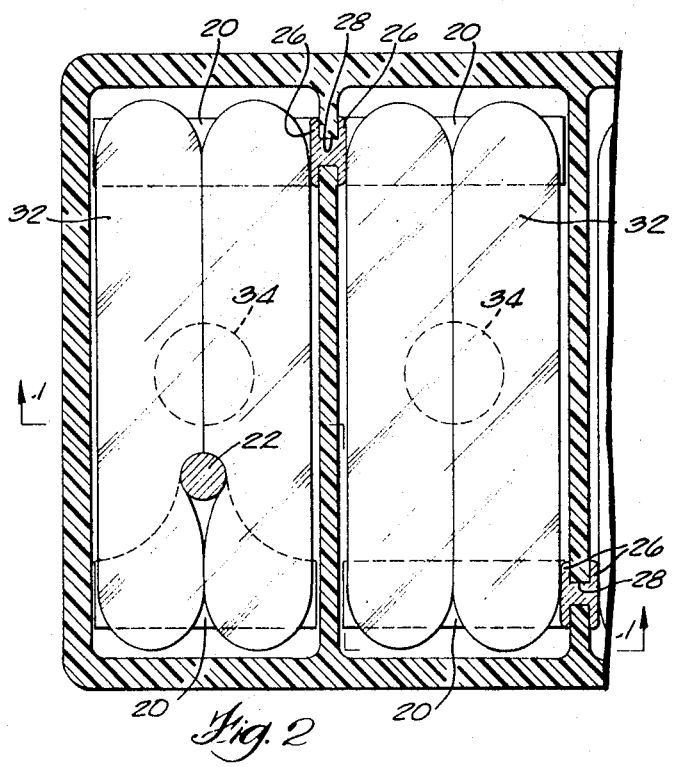
FIG. 2 is a plan view, partly in section, taken along the plane designated 2—2 of FIG. 1.

Electrolyte container 32 may be constructed so that, when filled, it is spaced from the cell compartment walls, as shown in FIGS. 1 and 2, so that water introduced into the battery through filling ports 64 will flow downwardly along the sides of the container into the cell chamber. Alternately, container 32 can be provided with molded-in channels or ports which will permit the flow of water into the cell chambers. Any such flow passages should be arranged so that the in-flowing water will not directly contact film 48 until the cell chamber 16 is filled.

The battery is activated by removing the vent cap 66 from filling port 64 and slowly pouring water through the opening. The total quantity of water added to the cell is that sufficient to dilute the concentrated acid stored in container 32 to the desired specific gravity. As the cell chamber 16 fills and the water level therein reaches or exceeds that of holding fixture 50, water passes through openings 58 and comes into contact with and dissolves film 48. Water-immiscible material 60, which is less dense than water, immediately floats upwardly allowing the water to contact pellet 46. As pellet 46 reacts exothermally with the water, it moves upwardly out of receptacle 44 and contacts the underside of container section 56 while releasing sufficient heat from the reaction with water to melt an opening in section 56. The vertical walls 68 of holding fixture 50 retain the floating pellet in a relatively localized area to insure adequate heating of section 56 to effect an opening.

Once an opening is formed in section 56, the concentrated sulfuric acid drains from container 32 through the opening via aperture 40. The rate at which the concentrated sulfuric acid drains from container 32, and therefore the rate of carbon dioxide evolution produced by the acid reacting with the plates, is controlled primarily by aperture 40. In other words, the rate of acid discharge is controlled substantially independent of the size, shape and location of the opening formed in section 56 by pellet 46. Accordingly, aperture 40 is sized to provide a drainage or discharge rate of the concentrated electrolyte 36 consistent with the tolerable carbon dioxide evolution without "boiling" acid out through filling port 64. When the location of the opening formed in section 56 by pellet 46 is displaced laterally from aperture 40, grooves 42 assist in the drainage of the acid from container 32 by providing drainage passages between the vicinity of the opening and aperture 40.

At least some of the openings 58 in holding fixture 50 extend upwardly along vertical walls 68. This arrangement permits ready venting of gases formed when pellet 46 reacts with the water and thereby prevents the formation of a gas pocket around the pellet which might inhibit the reaction necessary to obtain a sufficient release of heat to form an opening in section 56.

Although fixture 50 acts somewhat as a baffle for preventing the direct impingement of concentrated acid onto battery elements 18, additional protective means, such as a thin film of plastic, can be positioned on top of the elements 18 underneath the container 32 if desired. When container 32 is formed from a thin plastic film and cover 24 is heat sealed to battery container 12 by conventional techniques, a protective layer of thermal insulation, such as a thin sheet of fiberglass matting, can be placed over the container 32 to prevent any damage thereto from the sealing operation.

The following example is presented to exemplify this invention and should not be construed as limiting same in any manner.

EXAMPLE

A 0.1 gram pellet of metallic potassium was placed in a centrally located recess of a disk-shaped ceramic fixture approximately 1¾ inch in diameter with the recess, approximately 3/16 inch in diameter and about 3/16 inch deep, being previously filled with a 75//25 mixture of mineral spirits and mineral oil. The ceramic fixture was provided with eight equally-spaced grooves in communication with and emanating radially from the central recess. The entire fixture was enclosed and sealed in a 1 mil thick film of polyvinyl alcohol. Fixtures assembled in this manner were placed on the top of each of the elements of a 6-cell (12-volt), 60 ampere-hour dry charge storage battery. Sealed bags made from polyethylene, having a thickness of 2 mils and filled with 230±3 cc. of concentrated sulfuric acid with a specific gravity of 1.835, were placed in each cell compartment of the battery on top of the fixtures which have been previously installed. A cover having filling ports for each cell was then sealed onto the battery container. With the battery temperature at about 80° F., 740 cc. of water was added slowly to each cell to obtain 920 cc. of diluted acid having a specific gravity of 1.270 in each cell. Within 10 minutes after the water had been added, the temperature in all the cells was 150–180° F., indicating that a discharge opening has been formed in all of the acid-containing bags. Most of the bags were opened within two to five minutes. The specific gravities in the cell measured seven hours after activation were as follows:

| Cell: | Specific gravity |
|---|---|
| 1 | 1.245 |
| 2 | 1.245 |
| 3 | 1.245 |
| 4 | 1.245 |
| 5 | 1.240 |
| 6 | 1.240 |

From the above data it can be seen that, the specific gravities in each cell were quite acceptable for satisfactory battery activation. Upon initial charge of electrolyte, dry charge batteries typically exhibit lower specific gravities which then increase to the desired level upon charge. Therefore, even though the specific gravities were initially lower than 1.270, they were within the range considered acceptable for the initial electrolyte charge for a dry charge battery.

It has been found that substantially all of any remaining acid drains from the bag within a few days especially when the battery is installed in an automobile where it is subjected vibrations resulting from the normal operation of the automobile. Similar results have been obtained with sodium and lithium as the water-reactive material. Additional tests have been performed with electrolyte containers and activation assemblies constructed substantially in accordance with FIGS. 1–4 and even more rapid activations with lower temperature increases have been obtained. Furthermore, it has been found that the electrical performance characteristics of 60 ampere-hour batteries constructed in accordance with this invention are substantially the same as those of comparable conventional dry charge batteries.

What is claimed is:

1. A water-activated dry charge storage battery comprising:
    (a) a battery casing having a cover defining at least one cell compartment;
    (b) a battery element positioned within said cell compartment with a space provided within cell compartment above said element;
    (c) a sealed container storing concentrated electrolyte disposed in said space; and
    (d) an activation means, disposed adjacent said container, said activation means including a water-reactive material which releases sufficient heat upon reacting with water to melt and form a discharge opening in said container so that the concentrated electrolyte can drain therefrom.

2. The battery according to claim 1 wherein said water-reactive material is protected against oxidation during battery storage by a protective film of water-soluble material.

3. The battery according to claim 1 wherein said water-reactive material is selected from the group consisting of alkali metals, calcium, barium, calcium hydride, lithium hydride, lithium aluminum hydride, barium hydride, potassium hydride, sodium hydride, calcium carbide and barium carbide.

4. The battery according to claim 1 wherein said activation means including metering devices associated with said container which controls the rate of electrolyte discharge from said container substantially independent of the size and location of the discharge opening formed in said container by said water-reactive material.

5. The battery according to claim 2 where said water-soluble material is selected from the group consisting of polyvinyl alcohol, polymers of methylcellulose, and polyethylene oxide.

6. The battery according to caim 2 wherein said water-reactive material is further protected against moisture during battery storage by a water-immiscible material.

7. The battery according to claim 3 wherein said water-reactive material is an alkali metal.

8. The battery according to claim 6 wherein said water-reactive material is potassium.

9. A water-activable, dry charge, lead-acid storage battery comprising:
    (a) a battery casing having a cover defining at least one cell compartment, said cover being provided with a filling port in communication with said cell compartment;
    (b) a battery element positioned within said cell compartment with a space provided in said cell compartment above said element;
    (c) a sealed container storing concentrated sulfuric acid stored in said space;
    (d) an activation means juxtaposed to said container, said activation means including a fixture holding a water-reactive material capable of releasing sufficient heat upon reacting with water to melt and form a discharge opening in said container;
    (e) a protective film of a water-reactive material arranged to protect said water-reactive material against oxidation during battery storage; and
    (f) a metering device positioned adjacent to said container having an aperture through which the concentrated sulfuric acid drains when said discharge opening is formed.

10. The battery according to claim 9 wherein said water-reactive material is an alkali metal.

11. The battery according to claim 10 wherein said water-reactive material is a potassium pellet.

12. The battery according to claim 11 wherein said fixture includes a receptacle which is covered with said water-soluble material and filled with a water-immiscible material in which said pellet is immersed.

13. The battery according to claim 12 wherein said water-immiscible is a mixture of mineral spirits and mineral oil.

14. A method of activating a dry charge storage battery having at least one cell compartment with a battery element positioned therein comprising storing a predetermined amount of concentrated electrolyte in a container in said compartment above said element, adding sufficient water to said cell compartment to dilute said concentrated electrolyte to a predetermined specific gravity; and reacting said water with a water-reactive material which releases sufficient ehat to melt and form a discharge opening in said container thereby allowing said concentrated electrolyte to admix with said water.

15. The method according to claim 14 wherein said battery is a lead-acid battery and said concentrated electrolyte is sulfuric acid.

16. The method according to claim 15 wherein said water-reactive material is an alkali metal.

17. The method according to claim 16 wherein said water-reactive material is potassium.

References Cited

UNITED STATES PATENTS 3,304,202   2/1967   Sam _____ 136—6

WINSTON A. DOUGLAS, Primary Examiner

C. F. LEFEVOUR, Assistant Examiner

U.S. Cl. X.R.

136—90